United States Patent
Yamaguchi et al.

(10) Patent No.: US 7,224,570 B2
(45) Date of Patent: May 29, 2007

(54) PROCESS FOR PREPARING MULTILAYER CERAMIC CAPACITOR AND THE MULTILAYER CERAMIC CAPACITOR

(75) Inventors: Katsuyoshi Yamaguchi, Kokubu (JP); Koshiro Sugimoto, Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/168,256

(22) Filed: Jun. 27, 2005

(65) Prior Publication Data

US 2005/0286204 A1  Dec. 29, 2005

(30) Foreign Application Priority Data

Jun. 28, 2004 (JP) .............................. 2004-189772

(51) Int. Cl.
   *H01G 4/008* (2006.01)
(52) U.S. Cl. ..................................... 361/305; 29/25.42
(58) Field of Classification Search ........ 361/303–305; 29/25.03

See application file for complete search history.

(56) References Cited

U.S. PATENT DOCUMENTS

| | | | |
|---|---|---|---|
| 3,757,177 A | * | 9/1973 | Buehler .................... 361/321.4 |
| 5,097,391 A | * | 3/1992 | Nomura et al. .......... 361/321.4 |
| 5,319,517 A | * | 6/1994 | Nomura et al. .......... 351/321.4 |
| 2002/0146564 A1 | * | 10/2002 | Takai et al. ................. 428/403 |
| 2003/0039090 A1 | * | 2/2003 | Konaka et al. ............. 361/311 |
| 2004/0256603 A1 | * | 12/2004 | Celik et al. ................. 252/500 |
| 2005/0117274 A1 | * | 6/2005 | Miyauchi et al. ........ 361/321.2 |
| 2006/0116273 A1 | * | 6/2006 | Ito et al. ..................... 501/137 |

FOREIGN PATENT DOCUMENTS

| | | |
|---|---|---|
| JP | 2000-243650 | 9/2000 |
| JP | 2003-309037 | 10/2003 |
| WO | WO03/033752 | * 4/2005 |

* cited by examiner

Primary Examiner—Eric W. Thomas
(74) Attorney, Agent, or Firm—Hogan & Hartson LLP

(57) ABSTRACT

A process for preparing a multilayer ceramic capacitor of the present invention comprises the steps of forming a pattern sheet, laminating a plurality of the pattern sheets and firing to obtain a multilayer ceramic capacitor comprising dielectric layers and internal electrode layers that are alternately laminated. The pattern sheet comprises a dielectric material green sheet and a conductor pattern. The conductor pattern is formed on the dielectric material green sheet and contains a main component selected from Ni, Cu and their alloy, at least one selected from the elements of the groups 3B to 6B of the periodic table and at least one selected from Mn, Co and Fe. The multilayer ceramic capacitor so obtained has an internal electrode layer wherein occurrence of discontinuous portions in conductor patterns is suppressed even after firing.

4 Claims, 3 Drawing Sheets

PROCESS FOR PREPARING MULTILAYER CERAMIC CAPACITOR AND THE MULTILAYER CERAMIC CAPACITOR

Priority is claimed to Japanese Patent Application Nos. 2004-189772 filed on Jun. 28, 2004, 2004-341668 filed on Nov. 26, 2004, 2004-359851 filed on Dec. 13, 2004 and 2005-127396 filed on Apr. 26, 2005 the disclosure of which is incorporated by reference in its entirety.

BACKGROUND OF THE INVENTION

1. Field of the Invention

The present invention relates to a process for preparing a multilayer ceramic capacitor and the multilayer ceramic capacitor, and in particular, to a process for preparing a multilayer ceramic capacitor and the multilayer ceramic capacitor, wherein a base-metal material is used for a conductor pattern.

2. Description of Related Art

In recent years, in response to growing demand for smaller size and larger capacity, efforts have been made so that an internal electrode layer as well as a dielectric layer in a multilayer ceramic capacitor can be a thinner film. For example, a well-known method is to form on a film a conductor pattern that turns into an internal electrode layer, employing physically thin film forming method such as sputtering and deposition, or chemically thin-film forming method such as electroless plating (for example, Japanese Patent Application Laid-Open No. 2000-243650). In addition, as an appropriate forming method for mass production, it is proposed to employ electroplating method, using such electrolytic solution as nickel (for example, Japanese Patent Application Laid-Open No. 2003-309037).

According to the above conventional methods, it is possible to easily make conductor patterns thinner. However, among these thin films, especially, in a plated film obtained through electroplating method, metal additives that are added during manufacturing process, for example, sulfur etc. hardly form solid solution with Ni and are precipitated disproportionately in grain boundary portions of Ni in the form of an intermetallic compound such as $Ni_3S_2$ having a melting point of 640° C.

In cofiring with dielectric material green sheets, the intermetallic compound having a low melting point is melted. Therefore, the molting point of a base-metal material that is a main component is lowered, making conductor patterns discontinuous during cofiring with dielectric layers.

According to the above methods, among thin film of conductor patterns, especially, in a plated film obtained through electroplating method, in cofiring with dielectric material green sheets, the melting point of a base-metal material that is a main component is lowered, making conductor patterns discontinuous during cofiring with a dielectric layers.

As above, once conductor patterns turn discontinuous, the effective area of internal electrode layers is smaller, resulting in the problem of not being able to obtain desired electrostatic capacitance of a multilayer ceramic capacitor.

Moreover, when the conductor paste of nickel metal powder is used as an internal electrode layer, there is a problem that conductor patterns turn discontinuous, like the above-mentioned plated film.

SUMMARY OF THE INVENTION

The main advantage of the present invention is to provide a process for preparing a multilayer ceramic capacitor and the multilayer ceramic capacitor having an internal electrode layer wherein occurrence of discontinuous portions in conductor patterns is suppressed even after firing.

The first process for preparing the present invention is as follows. A pattern sheet comprises a dielectric material green sheet and a conductor pattern. The conductor pattern is formed on the dielectric material green sheet, and contains a main component selected from Ni, Cu and their alloy, at least one selected from the elements of the groups 3B to 6B of the periodic table, and at least one selected from Mn, Co and Fe. A plurality of the pattern sheets are laminated and then fired to obtain a multilayer ceramic capacitor in which dielectric layers and internal electrode layers are alternately laminated.

According to the first process for preparing, even when a conductor pattern used for a multilayer ceramic capacitor contains at least one selected from the elements of the groups 3B to 6B of the periodic table in a base-metal component such as Ni or Cu, at least one selected from Mn, Co and Fe is further contained, resulting in composite. For this reason, in an internal electrode layer, for example, prior to bonding of a base-metal material, Ni and one of the elements of the groups 3B to 6B, sulfur (S), Mn and S are bonded to form an intermetallic compound, MnS having a high melting point. This can suppress decrease in a melting point of a base-metal material and discontinuity in conductor patterns. As a result, in a multilayer ceramic capacitor, decrease in the effective area of an internal electrode layer can be prevented, and desired electrostatic capacitance can be ensured. As a conductor pattern, there is exemplified a plated film or a printed film of conductor paste.

Preferably, the conductor pattern further may contain at least one selected from Mo, W and Ti, so that creep strength can be increased. As a result, for example, even in the highest temperature range of firing where Ni turns soft, discontinuity of conductor patterns can be suppressed, and d in the effective area of an internal electrode layer in a multilayer ceramic capacitor can be prevented, ensuring desired electrostatic capacitance.

The second process for preparing the present invention is as follows. A pattern sheet comprises a dielectric material green sheet and a conductor pattern. The conductor pattern is formed on the dielectric material green sheet, and contains a main component selected from Ni, Cu and their alloy, and at least one selected from Mn, Co, Fe, Mo, W, Cr and Ti. A plurality of the pattern sheets are laminated and then fired to obtain a multilayer ceramic capacitor in which dielectric layers and internal electrode layers are alternately laminated. As a conductor pattern, there is exemplified a plated film or a printed film of conductor paste.

According to the second process for preparing, a conductor pattern used for a multilayer ceramic capacitor comprises an alloy (including an intermetallic compound) of the above base-metal component and at least one selected from Mn, Co, Fe, Mo, W, Cr and Ti. This makes it possible to suppress shrinkage in a during firing, and thereby discontinuity in conductor patterns composed mainly of a base-metal can be suppressed. As a result, in a multilayer ceramic capacitor, decrease in the effective area of an internal electrode layer can be prevented, and desired electrostatic capacitance can be ensured.

The first multilayer ceramic capacitor that can be obtained by the first process for preparing the present invention comprises dielectric layers and internal electrode layers that are alternately laminated. The internal electrode layer contains a main component selected from Ni, Cu and their alloy, at least one selected from the elements of the groups 3B to 6B of the periodic table, and at least one selected from Mn, Co and Fe. As an internal electrode layer, there is exemplified a plated film, or a sintered film of metal powder which is obtained by printing the conductor paste.

It is desirable that Mn compound is formed at the interface between the dielectric layer and the internal electrode layer. Thereby, effect to strengthen the connecting force between the dielectric layer and the internal electrode layer becomes greater.

When at least one selected from the elements of the groups 3B to 6B of the periodic table is contained in the above base-metal component, at least one selected from Mn, Co and Fe and further at least one selected from Mo, W, Cr and Ti may be contained, whereby much greater effect is exerted in suppressing discontinuity in the conductor patterns.

The second multilayer ceramic capacitor obtained by the second process for preparing the present invention comprises dielectric layers and internal electrode layers that are alternately laminated. The internal electrode layer contains a main component selected from Ni, Cu and their alloy, and at least one selected from Mn, Co, Fe, Mo, W, Cr and Ti. As an internal electrode layer, plating film or sintering film of the metal powder, which is obtained by printing the conductor paste, is exemplified.

The second multilayer ceramic capacitor can improve rigidity of an internal electrode layer, lessen softening during firing, and suppress plastic deformation. This leads to not only increase in the effective area of an internal electrode layer but also improvement in connecting property with a dielectric layer.

Other objects and advantages of the present invention will be clarified in the following detailed description.

DETAILED DESCRIPTION OF PREFERRED EMBODIMENTS

First Embodiment

Figure 1:
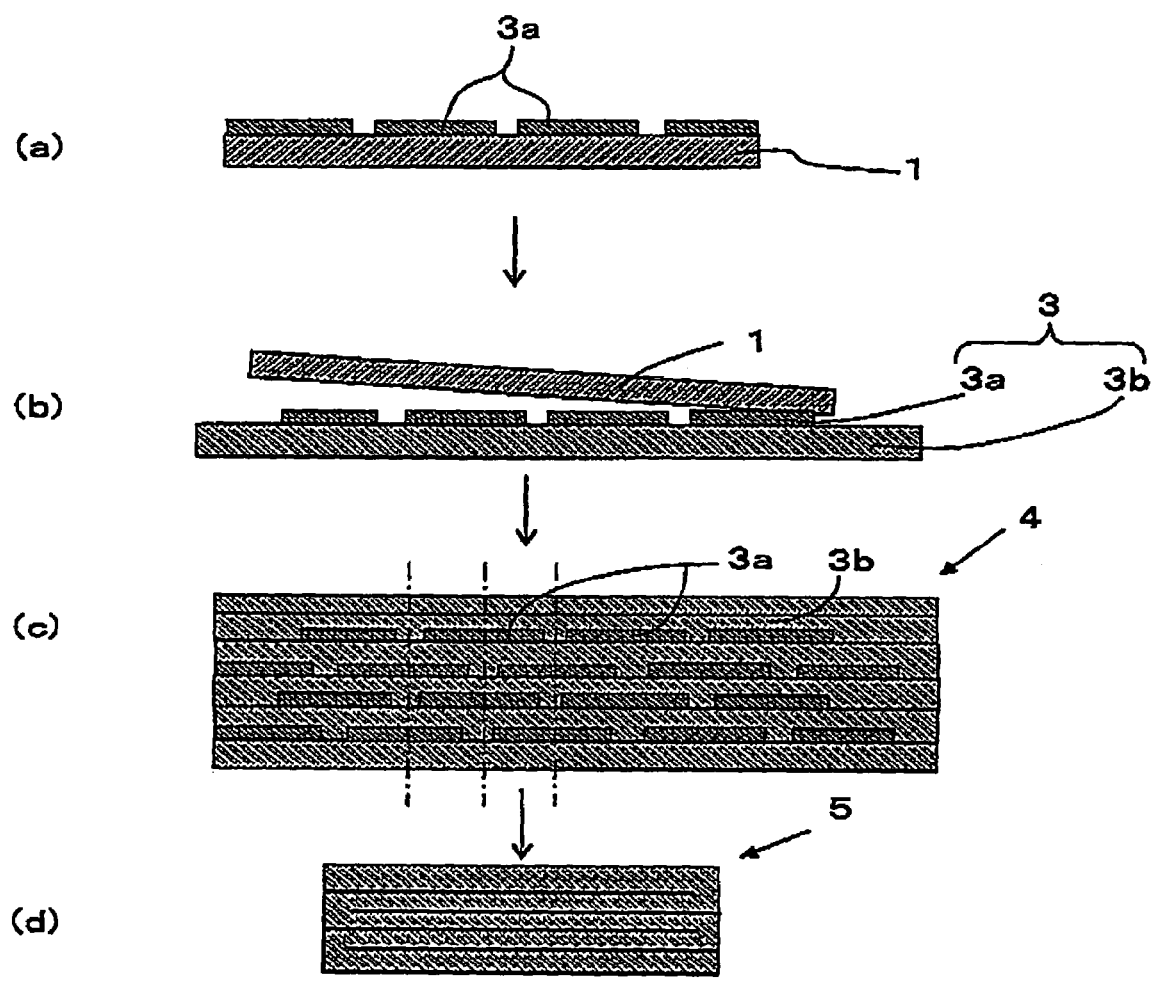
FIG. 1 is a flow chart for preparing a multilayer ceramic capacitor according to one embodiment of the present invention.

FIG. 1 is a flow chart for preparing a multilayer ceramic capacitor of the present invention. Method of preparing the present invention will be described as follows in order of process.

Process (a)

Using electroplating method, a plurality of plated film conductor patterns 3a are formed on a substrate plate 1. The plated film conductor pattern contains a main component selected from Ni, Cu and their alloy, at least one selected from the elements of the groups 3B to 6B of the periodic table and at least one selected from Mn, Co and Fe.

Besides the above plated film, the plated film conductor pattern 3a according to the present invention may contain a main component selected from Ni, Cu and their alloy, at least one selected from the elements of the groups 3B to 6B of the periodic table, at least one selected from Mn, Co and Fe, and at least one selected from the elements of the groups 4A to 6A of the periodic table. The elements of the groups 4A to 6A of the periodic table include Mo, W, Cr and Ti.

Any one element of Mo, W, Cr and Ti, compared to such elements as Mn, Co and Fe, can lower diffusion coefficient of a base-metal atom or reduce stacking fault energy. Therefore, unlike such elements as Mn, Co and Fe, inclusion of any one element of Mo, W, Cr and Ti can increase creep strength of a plated film, based on volume diffusion. Among these elements, Mo is preferably used because it facilitates formation of an alloy with Ni.

Process (b)

Next, by transcribing the plated film conductor pattern 3a so obtained from the substrate plate 1 to a dielectric material green sheet 3b, a pattern sheet 3 is formed. As dielectric materials constituting the dielectric material green sheet 3b, various paraelectric materials and ferroelectric materials can be preferably used. To achieve higher dielectric constant, it is preferable that barium titanate is a main component. When such dielectric materials are used, it is desirable that various additives or glass component are contained in order to improve dielectric characteristics and sinterability. In terms of larger capacity, preferably, the dielectric material green sheet 3b has thickness of not more than 3 μm, and after firing, a dielectric layer has thickness or not more than 2 μm.

In addition, in order to eliminate difference in level made by the conductor patterns, it is preferable to form, at the periphery of the plated film conductor pattern 3a, a ceramic pattern composed mainly of dielectric materials constituting the dielectric material green sheet 3b.

Process (c) and Process (d)

By laminating a plurality of pattern sheets 3, a laminated green body 4 is formed. Then, by cutting this laminated green body 4 into lattice-like shape as dashed lines indicate in FIG. 1(c), a capacitor green body 5 is formed (Process (d)). A plurality of plated film conductor patterns 3a are laminated so that they are alternately exposed to the opposite end face. By firing the capacitor green body 5, a capacitor body is formed.

The plated film conductor pattern 3a according to the present invention will be now described. It is important that the plated film conductor pattern 3a contains a main component selected from Ni, Cu and their alloy, at least one selected from the elements of the groups 3B to 6B of the periodic table, and at least one selected from Mn, Co and Fe. Among these Ni and Cu metals, in case of using ferroelectric materials such as barium titanate, Ni is preferable in cofiring with the dielectric material green sheet 3b. In case of using low-temperature firing type of paraelectric materials including bismuth, tin, Nb etc. or in case of using dielectric materials that are fired at a low temperature after adding glass component to barium titanate, Cu is preferable.

Examples of the elements of the group 3B of the periodic table include B, Al, Ga and In in terms of chemical symbols. Examples of the elements of the group 4B include C, Si, Ge, Sn and Pb, those of the elements of the group 4B include P, As, Sb and Bi, and those of the elements of the group 6B include S, Se and Te.

As for the elements of the groups 3B to 6B, if soluble in a plating bath, any metal component can be used. Because dielectric characteristics of a dielectric layer are less likely to be deteriorated, any one of sulfur (S), boron (B), phosphorus (P) and carbon (C) is desirably used. Sulfur (S) is especially desirable, because it suppresses pH and fluctuation of ion concentration in a plating bath containing a base-metal material oven if an element of the groups 3B to 6B is added.

Content of an element of the groups 3B to 6B in the plated film conductor pattern 3a is desirably $5 \times 10^{-4}$% by weight to 5% by weight. In particular, because melting of the plated film conductor pattern 3a that is caused by a formed intermetallic compound can be suppressed to ensure a desired effective area and attain larger electrostatic capacitance, the content is more desirably in the range of $300 \times 10^{-4}$% by weight to 1% by weight.

Among Mn, Co and Fe, Mn is desirable because it can form a higher-temperature intermetallic compound. It is also more desirable that the content of at least one selected from Mn, Co and Fe is $5 \times 10^{-4}$% by weight to 5% by weight, especially in the range of 0.03% by weight to 1% by weight, because melting of the plated film conductor pattern 3a is suppressed as above.

Content of Mo, W or Ti contained in the above plated film conductor pattern may be 5 to 50% by weight, preferably 10 to 20% by weight. The reasons for this are as follows: sinterability of a plated film with a dielectric layer, firing shrinkage and plastic deformation are suppressed; and in case of turning into an internal electrode layer, firing shrinkage can be reduced, the effective area can be increased and electrostatic capacitance can be larger.

For example, when sulfur (S) is contained as an intermetallic compound formed in a plated film conductor pattern, intermetallic compounds such as $Ni_3S_2$, $Ni_7S_6$, NiS etc. are sometimes dispersed and formed with Ni metal that is a main component of the plated film. In this case, at the interface between an internal electrode layer and a dielectric layer, an intermetallic compound is more likely to be combined with ceramics forming the dielectric layer than a base-metal material only. Thereby, connecting property between the internal electrode layer and the dielectric layer can be enhanced.

On the contrary, when the plated film conductor pattern 3a does not contain one selected from Mn, Co and Fe, cofiring of the plated film conductor pattern 3a with the dielectric material green sheet 3b shrinks the plated film conductor pattern 3a and forms many holes, making the effective area smaller.

As in the present invention, the plated film conductor pattern 3a composed mainly of a base-metal material that can attain higher melting point easily makes thickness of the plated film conductor pattern 3a thinner, leading to smaller difference in level made by the plated film conductor pattern 3a. Thickness of the plated film conductor pattern 3a may be not more than 1 μm, preferably not more than 0.8 μm. Moreover, in order to ensure the effective area as an internal electrode layer, thickness of the plated film conductor pattern 3a is desirably not less than 0.2 μm.

Figure 2:
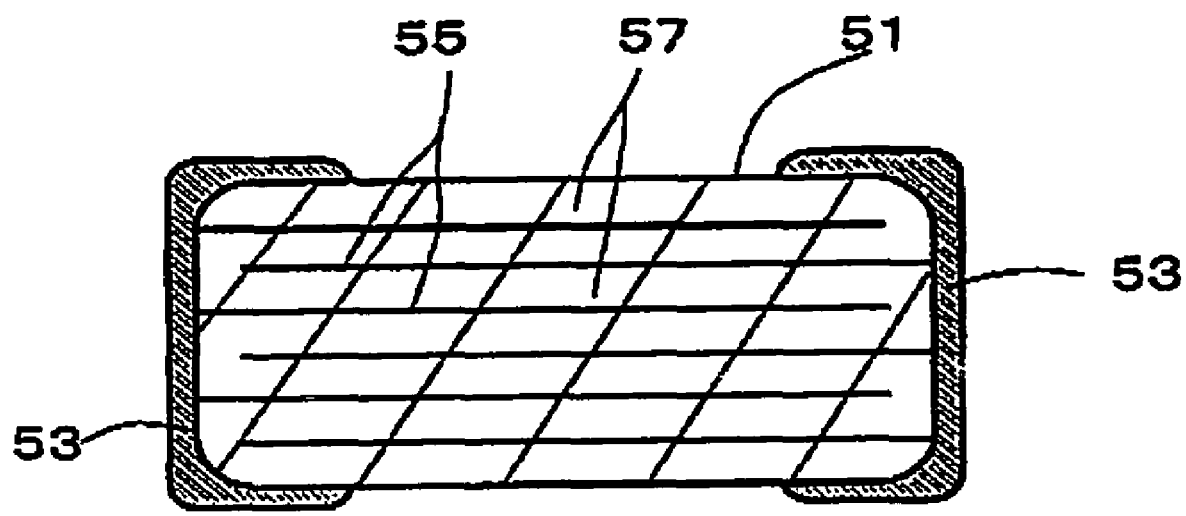
FIG. 2 is a schematic sectional view showing a multilayer ceramic capacitor according to one embodiment of the present invention.

As shown in FIG. 2, the multilayer ceramic capacitor of the present invention has a rectangular-solid-like capacitor body 51, on both end faces of which external electrodes 53 are formed. The capacitor body 51 comprises an internal electrode layer 55 and a dielectric layer 57 that are alternately laminated. The internal electrode layer 55 is alternately exposed to both opposite end faces of the capacitor body 51 and alternately has electrical connection with the external electrodes 53.

To achieve larger capacity, it is preferable that thickness of a dielectric layer constituting a multilayer ceramic capacitor is not more than 3 μm, thickness of an internal electrode layer is not more than 1 μm, and the number of laminated layers is not less than 100. The multilayer ceramic capacitor of the present invention is in particular suitable for a multilayer ceramic capacitor having thinner layers laminated higher, that is, a multilayer ceramic capacitor in which the dielectric layer 57 and the internal electrode layer 55 are made thinner and especially the internal electrode layer 55 is less likely to be embedded in the dielectric layer 57, lowering connecting force between the both layers.

The internal electrode layer of the present invention contains a main component selected from Ni, Cu and their alloy, at least one selected from the elements of the groups 3B to 6B of the periodic table and at least one selected from Mn, Co and Fe. Or the internal electrode layer of the present invention contains a main component selected from Ni, Cu and their alloy, at least one selected from the elements of the groups 3B to 6B of the periodic table, at least one selected from Mn, Co and Fe and at least one selected from the elements of the groups 4A to 6A of the periodic table including Mo, W, Cr, Ti etc.

Figure 3:
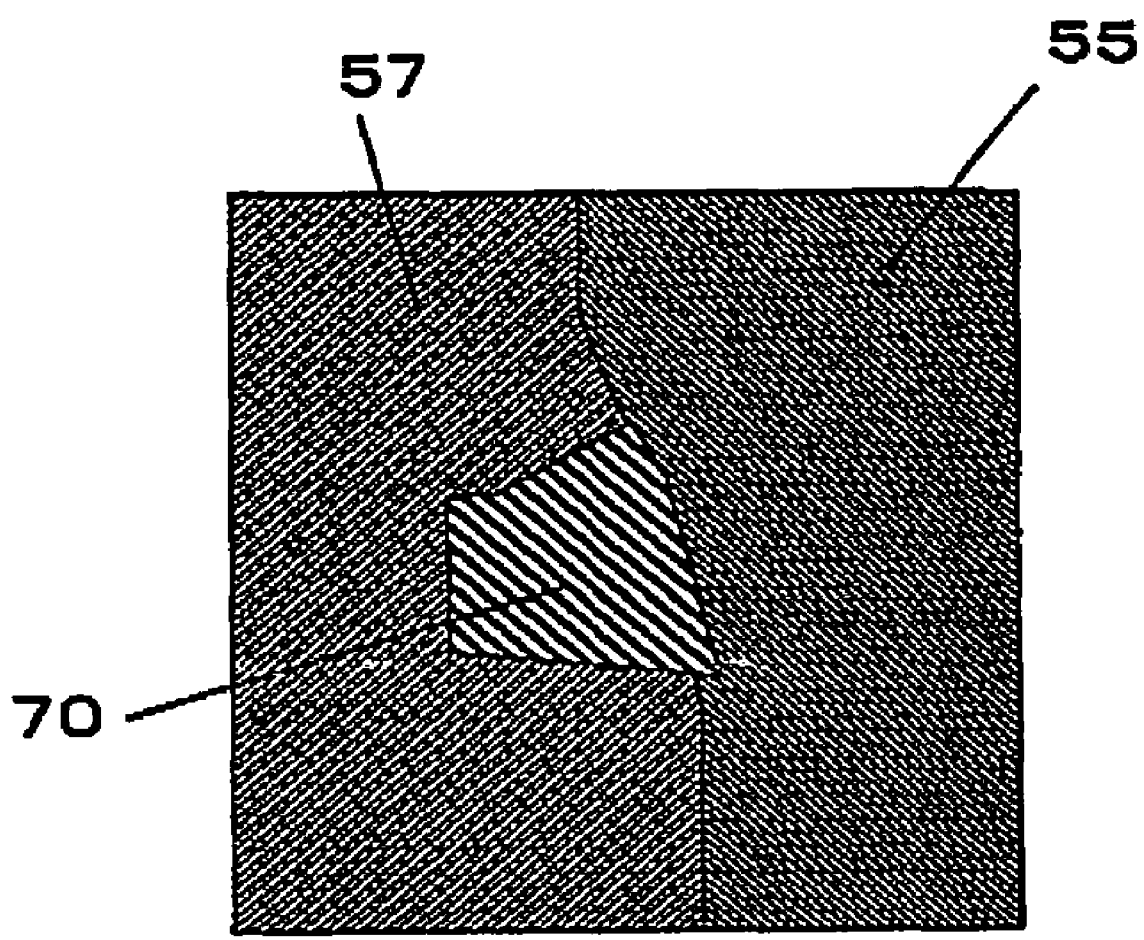
FIG. 3 is a pattern diagram showing one example of the interface portion between a dielectric layer and an internal electrode layer in a multilayer ceramic capacitor of the present invention.

FIG. 3 is a pattern diagram of the interface portion between the dielectric layer 57 and the internal electrode layer 55 in the multilayer ceramic capacitor of the present invention. As shown in FIG. 3, it is preferable that at the interface between the dielectric layer 57 and the internal electrode layer 55, Mn compound 70 such as Mn—Si—O composition is formed granularly or in laminae. This can improve connecting force between the dielectric layer 57 and the internal electrode layer 55 in the multilayer ceramic capacitor of the present invention. This is because in case of combining Si that constitutes the dielectric layer 57, with Mn that is contained in a plated film forming the internal electrode layer 55, the components on the sides of the dielectric layer 57 and the internal electrode layer 55 are combined, leading to improvement in connecting effect between the both layers.

Regarding other Mn compounds of the present invention than the above Mn—Si—O composition, a compound of other metal oxides constituting the dielectric layer 57 and Mn, or such Mn compound as MnO and $MnO_2$ can exert similar effect, if it is formed at the interface between the dielectric layer 57 and the internal electrode layer 55. Mn compound may be Mn—Ni—Si—O, Mn—Ni—S—O, or Mn—Ni—Si—S—O, which contains nickel that is a component of the internal electrode layer, and further this compound may contain Mo, W, Cr, etc.

Moreover, according to the present invention, the conductor pattern formed by printing a conductor paste can be employed, instead of plated film. Conductor paste may contain the metal powder of the same composition as the plated film. That is, it is desirable that the base metal ingredient, which is the main component, and other metal ingredients combined for the base metal ingredient are the same ingredients as a plated film, since it becomes the same effect as a plated film.

As for the metal ingredient combined to main-component metal, it is desirable to use the sulfate of the ingredient. When using sulfate, S (sulfur) can be included in base metal powder simultaneously with an additive ingredient.

It is desirable that the mean particle diameter of base metal powder is 100 to 400 nm, thereby obtaining an average that the thin layer pattern can obtain in the above particle diameter range.

In addition, the Mn compound 70, such as the above-mentioned Mn—Si—O composition, can be similarly formed, when conductor paste is used.

Second Embodiment

Next, the second embodiment of the present invention will be described, based on FIG. 1 and FIG. 2 used in description of the first embodiment.

Process (a)

Using electroplating method, a plurality of plated film conductor patterns 3a are formed on a substrate plate 1. In this embodiment, an important thing is that the plated film conductor pattern 3a contains a main component selected from Ni, Cu and their alloy, and at least one selected from Mn, Co, Fe, Mo, W, Cr and Ti.

In the plated film conductor pattern 3a, particularly, it is preferable that at least one metal component selected from Mn, Co and Fe, and further at least one selected from Mo, W, Cr and Ti are contained at the same time because an intermetallic compound having high melting point is easily formed in a plated film. For example, when Mo etc. forms a solid solution with a plated film composed mainly of Ni, lattice diffusion speed of the above base-metal can be lowered during firing.

In other words, compared to such elements as Mn, Co, Fe etc, any element of Mo, W, Cr and Ti enables diffusion coefficient of a base-metal atom and stacking fault energy to be reduced. Besides such diffusion-suppressing mechanism as surface diffusion and grain boundary diffusion that am caused by such elements as Mn, Co and Fe, addition of Mo, W, Cr or Ti can suppress lattice diffusion (volume diffusion) in a plated film composed many of a base-metal. This allows creep strength of a plated film to be increased. As a result, for example, even in the highest temperature range of firing where Ni turns soft, discontinuity of conductor patterns can be suppressed, and decrease in the effective area of an internal electrode layer in a multilayer ceramic capacitor can be prevented, ensuring desired electrostatic capacitance. As the above element, mixed crystal system or alloy system of Mn and Mo is more preferable, because it facilitates formation of an alloy with Ni.

Content of at least one metal component selected from the above groups of Mn, Co, Fe, Mo, W, Cr and Ti in the plated film conductor pattern 3a is preferably $3 \times 10^{-4}$ to 30% by weight, and in particular more preferably in the range of 10 to 20% by weight, because plastic deformation of the plated film conductor pattern 3a that is caused by an intermetallic compound can be suppressed to ensure a desired effective area and attain larger electrostatic capacitance. Especially it is more preferable that content of at least one metal component selected from Mn, Co and Fe is $5 \times 10^{-4}$ to 1% by weight, and content of at least one metal component selected from the groups of Mo, W, Cr and Ti is 5 to 30% by weight, particularly 10 to 20% by weight. In case of containing a base-metal component only and not containing at least one metal component selected from Mn, Co, Fe, Mo, W, Cr and Ti, it is impossible to suppress shrinkage during firing and to increase the effective area Of an internal electrode layer in a multilayer ceramic capacitor.

Process (b)

By transcribing the plated film conductor pattern 3a so obtained on a dielectric material green sheet 3b, a pattern sheet 3 is formed. To achieve higher dielectric constant, a dielectric material composed mainly of barium titanate is preferable for the dielectric material green sheet 3b. It is desirable that this dielectric material contains various additives and glass component to improve dielectric characteristics and sinterability. In terms of larger capacity, it is preferable that the dielectric material green sheet 3b has thickness of not more than 3 μm and after firing a dielectric layer has thickness of not more than 2 μm.

In the present invention, in order to eliminate difference in level made by conductor patterns, it is desirable to form, at the periphery of the plated film conductor pattern 3a, a ceramic pattern composed mainly of dielectric materials constituting the dielectric material green sheet 3b.

Process (c) and Process (d)

By laminating a plurality of pattern sheets 3, a laminated green body 4 is formed. Then, by cutting (d) this laminated green body 4 into lattice-like shape as dashed lines indicate in FIG. 1(*c*), a capacitor green body 5 is formed (Process (d)). In this capacitor green body 5, plated film conductor patterns 3a are laminated so that they are alternately exposed to the opposite end face. By firing the capacitor green body 5, a capacitor body is formed.

When the plated film conductor pattern 3a does not contain at least one selected from Mn, Co, Fe, Mo, W, Cr and Ti, cofiring of the plated film conductor pattern 3a with the dielectric material green sheet 3b shrinks the plated film conductor pattern 3a and forms many holes, making the effective area smaller.

As an intermetallic compound formed in the plated film conductor pattern of the present invention, for example, such intermetallic compound as Mn compound, e.g. Ni—Mn—Mo, is sometimes dispersed and formed with Ni metal that is a main component of a plated film. In this case, at the interface between an internal electrode layer and a dielectric layer, an intermetallic compound is more likely to be combined with ceramics forming the dielectric layer than a base-metal material only. Thereby, connecting property between the internal electrode layer and the dielectric layer can be enhanced. Presence of such an intermetallic compound at the interface with the dielectric layer can increase the effective area of the internal electrode layer.

When the plated film conductor pattern 3a is composed mainly of a base-metal material including such elements as the present invention, it facilitates smaller thickness of the plated film conductor pattern 3a and allows difference in level made by the plated film conductor patterns 3a to be smaller. The thickness is not more than 1 μm, especially preferably not more than 0.8 μm, and desirably not less than 0.2 μm in order to ensure the effective area as an internal electrode layer.

As shown in FIG. 2, the multilayer ceramic capacitor of the present invention has a rectangular-solid-like capacitor body 51, on both end faces of which external electrodes 53 are formed. The capacitor body 51 comprises an internal electrode layer 55 and a dielectric layer 57 that are alternately laminated. The internal electrode layer 55 is alternately exposed to both opposite end faces of the capacitor body 51 and alternately has electrical connection with the external electrodes 53. The internal electrode layer of the present invention contains a main component selected from Ni, Cu and their alloy, and at least one selected from Mn, Co, Fe, Mo, W, Cr and Ti. To achieve smaller size, thinner shape and larger capacity, it is preferable that thickness of a dielectric layer is not more than 3 μm and thickness of an internal electrode layer is not more than 1 μm. Others are the same as the first embodiment.

EXAMPLES

The present invention will be now described in more detail, giving examples and comparative examples. However, it is to be understood that the present invention is not limited to the following examples.

Example I

A multilayer ceramic capacitor was prepared as follows. First, a predetermined amount of organic binder, plasticizer, dispersant and solvent were mixed with dielectric powder composed mainly of $BaTiO_3$, and using a vibrating mill, grinding and kneading were performed to prepare slurry. Subsequently, with a die coater, dielectric material green sheet having thickness of 2.4 μm was prepared on a polyester carrier film.

Next, using a substrate plate made of mirror-polished stainless steel plate, photosensitive resist resin was applied on its surface to form a resist pattern.

Then, adjusting electric current density and plating time, electroplating was conducted. Thereby, 0.3 μm-thick Ni plated films containing different amounts of an element of the groups 3B to 6B and another additive element (Mn etc.) were formed on the stainless steel substrate plate. In this case, for example, by solving sulfate ion containing an element of the groups 3B to 6B in a plating bath and solving manganese sulfamate for Mn, electroplating was conducted in combination with Ni anode. Likewise, Co and Fe solved in a plating bath were used. Nickel sulfamate plating bath was applied as plating bath. Concentration of each metal component in a plated film conductor pattern was adjusted, changing metal concentration in the plating bath and electric current density during plating. The type of additive elements in the plated film conductor pattern so obtained and the content of those in the conductor pattern were shown in Table 1.

This Ni plated film conductor pattern was placed on the dielectric material green sheet and transcribed by thermocompression bonding under the condition of 80° C. and 80 kg/cm² to prepare a dielectric material green sheet having an internal electrode pattern transcribed.

Two hundred sheets of the dielectric material green sheet having this plated film conductor pattern transcribed were laminated and subjected to laminating press at a temperature of 100° C. and at a pressure of 200 kg/cm² to prepare a laminated green body.

Then, this laminated green body was cut into lattice-like shape to obtain a capacitor green body. After the capacitor green body was subjected to binder burn-out in a nonoxidative atmosphere of 300° C. to 500° C., firing was performed in the same atmosphere of 1300° C. for two hours to prepare a capacitor body.

Lastly, in the capacitor body so obtained, Cu paste containing glass powder was applied on each end face to which internal electrode layers were exposed. Further, after seizure in an atmosphere of nitrogen, Ni plated films and Sn plated films were formed on the surface of the external electrodes to prepare a multilayer ceramic capacitor having external electrodes electrically connected with internal electrode layers.

The outside dimension of the multilayer ceramic capacitor so obtained was 1.25 mm in width, 2.0 mm in length and 1.25 mm in thickness. Thickness of the dielectric layer between the internal electrode layers was 2 μm.

After firing, initial electrostatic capacitance (C) for each 100 pieces of the multilayer ceramic capacitor so obtained was measured. Measurement was conducted at a base temperature of 25° C., at a frequency of 1.0 kHz and at an input signal level of 0.5 Vrms. The target value of electrostatic capacitance is 4.7 μF (tolerance: ±10%). Content of an element of the groups 3B to 6B in the internal electrode layer was figured out, applying ICP-MS (Inductively Coupled Plasma Mass Spectrometry). In addition, by conducting thermal shock test with the above capacitor dipped in a solder bath at a temperature of 340° C. and 400° C., occurrence of delamination was checked for each temperature.

For comparison, by forming plated film conductor patterns that do not contain Mn in a Ni plated film, multilayer ceramic capacitors were prepared and evaluated in the same way as Example 1. The results are presented in Table 1.

TABLE 1

| Sample No. | Element of the groups 3B to 6B | | Additive metal | | Electrostatic capacitance μF | Thermal shock test (340° C.) Occurrence of delamination (1) | Thermal shock test (400° C.) Occurrence of delamination (1) |
|---|---|---|---|---|---|---|---|
| | Element name | Content wt % | Element | Content wt % | | | |
| *1 | Sulfur | $6 \times 10^{-4}$ | Mn | 0 | 3.9 | 1/100 | 2/100 |
| *2 | Sulfur | 0.2 | Mn | 0 | 3.8 | 1/100 | 2/100 |
| *3 | Sulfur | 1 | Mn | 0 | 3.8 | 1/100 | 2/100 |
| 4 | Sulfur | $5 \times 10^{-4}$ | Mn | $5 \times 10^{-4}$ | 4.7 | 0/100 | 0/100 |
| 5 | Sulfur | 0.2 | Mn | 0.2 | 4.8 | 0/100 | 0/100 |
| 6 | Sulfur | 1 | Mn | 1 | 4.8 | 0/100 | 0/100 |
| 7 | Sulfur | 5 | Mn | 5 | 4.7 | 0/100 | 0/100 |
| 8 | Boron | 1 | Mn | 1 | 4.7 | 0/100 | 0/100 |
| 9 | Carbon | 1 | Mn | 1 | 4.8 | 0/100 | 0/100 |
| 10 | Phosphorus | 1 | Mn | 1 | 4.8 | 0/100 | 0/100 |
| 11 | Sulfur | 0.2 | Co | 0.2 | 4.7 | 0/100 | 1/100 |
| 12 | Sulfur | 0.2 | Fe | 0.2 | 4.7 | 0/100 | 1/100 |

Target value of electrostatic capacitance: 4.7 μF
Sample marked "*" is out of the scope of the present invention.
(1) "Occurrence of delamination" indicates how many out of 100 pieces of multilayer ceramic capacitors had delamination.

As apparent from the results in Table 1, the samples prepared by using an internal electrode pattern containing any one element of the groups 3B to 6B and any one selected from Mn, Co or Fe in a plated film could achieve after-firing electrostatic capacitance of not less than 4.7 µF. Particularly, in the samples having a plated film containing Mn, Mn—Si compound was formed at the interface between a dielectric layer and an internal electrode layer, and occurrence of delamination was not seen even at a temperature of 400° C. during thermal shock test.

In case of using a plated film conductor pattern that does not contain any one selected from Mn, Co or Fe in a Ni plated film, after-firing electrostatic capacitance could not reach the target value.

Example 2

Plated film conductor patterns were prepared, so that they could be composed mainly of Ni and contain at least one selected from the elements of the groups 3B to 6B of the periodic table, at least one selected from Mn, Co or Fe and at least one selected from the elements of the groups 4A to 6A such as Mo, W, Cr and Ti. Except for this, the same process for preparing as Example 1 was applied to prepare the multilayer ceramic capacitors (Sample Nos. 13 to 20). The evaluation was conducted in the same way.

On the other hand, when a plated film conductor pattern was composed mainly of Cu, dielectric materials that had glass component added to barium titanate and were fired at a low temperature were used. By applying a copper sulfate plating bath and adding the additives shown in Table 2, as prepared Ni plated films, 0.3 µm-thick Cu plated film patterns were prepared (Samples Nos. 21 and 22). Next, using the same process as Ni plated films, except that firing was conducted at a temperature of 1000° C., multilayer ceramic capacitors were prepared and evaluated. The results were presented in Table 2.

Example 3

A multilayer ceramic capacitor was prepared as follows. First, a predetermined amount of organic binder, plasticizer, dispersant and solvent were mixed with dielectric powder composed mainly of $BaTiO_3$, and using a vibrating mill, grinding and kneading were performed to prepare slurry. Subsequently, with a die coater, a dielectric material green sheet having thickness of 2.4 µm was prepared on a polyester carrier film.

Next, using a substrate plate made of mirror-polished stainless steel plate, photosensitive resist resin was applied on its surface to form a resist pattern.

Then, adjusting electric current density and plating time, electroplating was conducted. Thereby, 0.3 µm-thick plated films composed mainly of Ni were formed on the stainless steel substrate plate. Nickel sulfamate plating bath was applied as plating solution. In this case, for example, as for Mn, adding manganese sulfate to a plating bath, electroplating was conducted. Co and Fe, being added in a plating bath, were employed in the same way. As for Mo, W, Ti and Cr, sodium molybdate and sodium tungstate etc. were added to a plating bath. Concentration of each metal component in a plated film conductor pattern was adjusted, changing metal concentration in a plating bath and electric current density during plating. The additive metal contained in the conductor pattern and its content were presented in Table 3.

Next, this Ni plated film conductor pattern was placed on the dielectric material green sheet and transcribed by thermocompression bonding under the condition of 80° C. and 80 kg/cm² to prepare a dielectric material green sheet having an internal electrode pattern transcribed.

TABLE 2

| Sample No. | Element of the groups 3B to 6B | | Additive metal | | Element of the groups 4A to 6A | | Electrostatic capacitance µF | Thermal shock test (340° C.) Occurrence of delamination (1) | Thermal shock test (400° C.) Occurrence of delamination (1) |
|---|---|---|---|---|---|---|---|---|---|
| | Element name | Content wt % | Element | Content wt % | Element | Content wt % | | | |
| 13 | Sulfur | 5 × 10⁻⁴ | Mn | 5 × 10⁻⁴ | Mo | 10 | 5.1 | 0/100 | 0/100 |
| 14 | Sulfur | 0.2 | Mn | 0.2 | Mo | 10 | 5.1 | 0/100 | 0/100 |
| 15 | Sulfur | 1 | Mn | 1 | Mo | 10 | 4.9 | 0/100 | 0/100 |
| 16 | Sulfur | 1 | Mn | 1 | Mo | 20 | 4.9 | 0/100 | 0/100 |
| 17 | Sulfur | 1 | Mn | 5 | Mo | 50 | 4.8 | 0/100 | 0/100 |
| 18 | Sulfur | 1 | Mn | 1 | Mo | 70 | 4.6 | 0/100 | 0/100 |
| 19 | Sulfur | 1 | Mn | 1 | W | 10 | 4.9 | 0/100 | 0/100 |
| 20 | Sulfur | 1 | Mn | 1 | Ti | 10 | 4.8 | 0/100 | 0/100 |
| 21 | Sulfur | 1 | Mn | 1 | Mo | 10 | 4.9 | 0/100 | 0/100 |
| 22 | Sulfur | 1 | Mn | 1 | Cr | 10 | 4.8 | 0/100 | 0/100 |

(1) "Occurrence of delamination" indicates how many out of 100 pieces of multilayer ceramic capacitors had delamination.

As apparent form the results in Table 2, The electrostatic capacitance of each ceramic multilayer ceramic capacitor prepared by using the plated film conductor pattern of the present invention is in tolerance of the target value (4.7 µF±10%). It also became apparent that during firing, shrinkage of internal electrode layers and occurrence of voids were suppressed and that the effective area was ensured.

Two hundred sheets of the dielectric material green sheet having this plated film conductor pattern transcribed were laminated and subjected to laminating press at a temperature of 100° C. and at a pressure of 200 kgf/cm² to prepare a laminated green body.

Then, this laminated green body was cut into lattice-like shape to obtain a capacitor green body. After the capacitor green body was subjected to binder burn-out in a nonoxidative atmosphere of 300° C. to 500° C., firing was performed in the same atmosphere of 1300° C. for two hours to prepare a capacitor body.

Lastly, in the capacitor body so obtained, Cu paste containing glass powder was applied on each end face to which internal electrode layers were exposed. Subsequently, seizure was performed in an atmosphere of nitrogen. Further, after seizure in an atmosphere of nitrogen, Ni plated films and Sn plated films were formed on the surface of the external electrodes to prepare a multilayer ceramic capacitor having external electrodes electrically connected with internal electrode layers.

The outside dimension of the multilayer ceramic capacitor so obtained was 1.25 mm in width, 2.0 mm in length and 1.25 mm in thickness. Thickness of the dielectric layer between the internal electrode layers was 2 μm.

After firing, initial electrostatic capacitance (C) for each 100 pieces of the multilayer ceramic capacitor so obtained was measured. Measurement was conducted at a base temperature of 25° C., at a frequency of 1.0 kHz and at an input signal level of 0.5 Vrms. The target value of electrostatic capacitance is 4.7 μF (tolerance: ±10%). Content of a metal component in the internal electrode layer was figured out, applying ICP-MS emission spectrometry.

For comparison, by forming a plated film conductor pattern composed of Ni only, multilayer ceramic capacitors were prepared and evaluated in the same way as the present invention. The results were presented in Table 3.

TABLE 3

| Sample No. | Additive metal 1 Element | Additive metal 1 Content weight % | Additive metal 2 Element | Additive metal 2 Content weight % | Electrostatic capacitance μF |
|---|---|---|---|---|---|
| *23 | — | 0 | — | 0 | 4.2 |
| 24 | — | 0 | Mo | 10 | 4.8 |
| 25 | — | 0 | Mo | 20 | 4.8 |
| 26 | — | 0 | Mo | 50 | 4.7 |
| 27 | Mn | $5 \times 10^{-4}$ | Mo | 10 | 5.1 |
| 28 | Mn | 0.2 | Mo | 10 | 5.1 |
| 29 | Mn | 1 | Mo | 10 | 5 |
| 30 | Mn | 5 | Mo | 10 | 4.8 |
| 31 | Mn | 1 | W | 10 | 4.9 |
| 32 | Mn | 1 | Ti | 10 | 4.9 |
| 33 | Co | 0.2 | Mo | 10 | 4.8 |
| 34 | Fe | 0.2 | Mo | 10 | 4.7 |
| 35 | Mn | 1 | Cr | 10 | 4.9 |

Sample marked "*" is out of the scope of the present invention.

As apparent from the results in Table 3, Sample Nos. 24 to 35 prepared by using an internal electrode pattern whose plated film is composed of Ni and at least one selected from the groups of Mn, Co, Fe, Mo, W, Cr and Ti could achieve after-firing electrostatic capacitance of not less than 4.7 μF.

Especially, the sample multilayer ceramic capacitors having a plated film internal electrode layer that contains $5 \times 10^{-4}$% by weight of Mn and 10% by weight of Mo could achieve electrostatic capacitance of not loss than 5 μF.

On the contrary, Sample No. 23 having a plated film conductor pattern that does not contain any one of Mn, Co or Fe in a Ni plated film could not reach the target value of after-firing electrostatic capacitance.

Example 4

The multilayer ceramic capacitor which used conductor paste for the conductor pattern instead of the plated film was produced as follows. As for the dielectric green sheet, the same dielectric green sheet as Example 1 was used. The conductor paste was prepared by mixing, with ethyl cellulose and alpha-terpineol solvent, the dried mixture of the same dielectric powder (50 nm of mean particle diameter) as what was used for the dielectric green sheet, nickel powder whose mean particle diameter is 200 nm and manganese sulfate solution.

Next, on the dielectric green sheet, the conductor paste thus obtained was printed so that it might become the same area ratio as Example 1. The kind and content of the added elements in a conductor pattern arm shown in Table 4.

Two hundred sheets of the dielectric green sheet having the printed conductor pattern was laminated and subjected to laminating press at a temperature of 100° C. and at a pressure of 200 kg/cm² to prepare a laminated green body.

Then, this laminated green body was cut into lattice-like shape to obtain a capacitor green body. After the capacitor green body was subjected to binder burn-out in a nonoxidative atmosphere of 300° C. to 500° C., firing was performed in the same atmosphere of 1300° C. for two hours to prepare a capacitor body.

Lastly, in the capacitor body so obtained, Cu paste containing glass powder was applied on each end face to which internal electrode layers were exposed. Further, after seizure in an atmosphere of nitrogen, Ni plated films and Sn plated films were formed on the surface of the external electrodes to prepare a multilayer ceramic capacitor having external electrodes electrically connected with internal electrode layers.

The outside dimension of the multilayer ceramic capacitor so obtained was 1.25 mm in width, 2.0 mm in length and 1.25 mm in thickness. Thickness of the dielectric layer between the internal electrode layers was 2 μm. The internal electrode layer was 0.3 μm in thickness on the average.

After firing, Content of an element of the groups 3B to 6B in the internal electrode layer, initial electrostatic capacitance (C) and thermal shock test of the multilayer ceramic capacitor so obtained were performed on the same conditions as Example 1. The results are presented in Table 4.

TABLE 4

| Sample No | Element of the groups 3B to 6B Element name | Element of the groups 3B to 6B Content | Additive metal Element | Additive metal Content | Electrostatic capacitance μF | Thermal shock test (340° C.) Occurrence of delamination (1) | Thermal shock test (400° C.) Occurrence of delamination (1) |
|---|---|---|---|---|---|---|---|
| 36 | S | $5 \times 10^{-4}$ | Mn | $5 \times 10^{-4}$ | 4.6 | 0/100 | 1/100 |
| 37 | S | 0.2 | Mn | 0.2 | 4.7 | 0/100 | 0/100 |

TABLE 4-continued

| Sample No | Element of the groups 3B to 6B | | Additive metal | | Electrostatic capacitance μF | Thermal shock test (340° C.) Occurrence of delamination (1) | Thermal shock test (400° C.) Occurrence of delamination (1) |
|---|---|---|---|---|---|---|---|
| | Element name | Content | Element | Content | | | |
| 38 | S | 1 | Mn | 1 | 4.7 | 0/100 | 0/100 |
| 38 | S | 5 | Mn | 5 | 4.6 | 0/100 | 1/100 |
| 39 | S | 1 | Co | 1 | 4.6 | 0/100 | 1/100 |
| 40 | S | 1 | Fe | 1 | 4.6 | 0/100 | 1/100 |

Target value of electrostatic capacitance: 4.7 μF
(1) "Occurrence of delamination" indicates how many out of 100 pieces of multilayer ceramic capacitors had delamination.

As apparent from Table 4, the samples prepared by using the conductor pattern for internal electrodes containing S which is an element of the groups 3B to 6B, and any one of Mn, Co and Fe, could achieve after-firing electrostatic capacitance in tolerance of a target value (4.7 μF±10%). Particularly, in samples obtained by using conductor film containing S and Mn, the Mn—Si compound was formed at the interface between a dielectric layer and an internal electrode layer, and occurrence of delamination was not seen even at a temperature of 400° C. during thermal shock test.

What is claimed is:

1. A multilayer ceramic capacitor comprising dielectric layers and internal electrode layers that are alternately laminated, the internal electrode layer being an internal electrode layer that contains a main component selected from Ni, Cu and their alloy; Mn; at least one selected from the group consisting of C and S, and at least one selected from Co, Fe, Mo, W, Cr and Ti, wherein Mn compound is formed, exposed to the surface of the internal electrode layer, wherein the Mn compound exposed to the surface of the internal electrode layer is an intermetallic compound containing Ni.

2. The multilayer ceramic capacitor according to claim 1, wherein the internal electrode layer is a plated film.

3. The multilayer ceramic capacitor according to claim 1, wherein the internal electrode layer is a sintered film of metal powder.

4. The multilayer ceramic capacitor according to claim 1, wherein thickness of the internal electrode layer is not more than 1 μm.

* * * * *